US007607492B2

(12) United States Patent
Seith et al.

(10) Patent No.: US 7,607,492 B2
(45) Date of Patent: Oct. 27, 2009

(54) ELECTRIC MOTOR IMPACT TOOL

(75) Inventors: Warren Andrew Seith, Bethlehem, PA (US); Mark Templeton McClung, Andover, NJ (US); William M. Ball, Jr., Stockton, NJ (US); Daniel J. Becker, Monroe Township, NJ (US)

(73) Assignee: Ingersoll Rand Company, Montvale, NJ (US)

(*) Notice: Subject to any disclaimer, the term of this patent is extended or adjusted under 35 U.S.C. 154(b) by 0 days.

(21) Appl. No.: 11/971,347

(22) Filed: Jan. 9, 2008

(65) Prior Publication Data

US 2008/0173458 A1 Jul. 24, 2008

Related U.S. Application Data

(62) Division of application No. 11/588,179, filed on Oct. 26, 2006.

(51) Int. Cl.
*B23Q 5/00* (2006.01)

(52) U.S. Cl. ............................ 173/176; 173/1; 173/93; 173/93.5; 173/93.6

(58) Field of Classification Search ..................... 173/1, 173/93, 93.5, 93.6, 109, 176, 178, 179
See application file for complete search history.

(56) References Cited

U.S. PATENT DOCUMENTS 2,256,496 A 9/1941 Girard
3,552,499 A 1/1971 Maurer
3,661,217 A 5/1972 Maurer
4,316,512 A * 2/1982 Kibblewhite et al. ......... 173/183
5,619,117 A 4/1997 Koenck
5,646,508 A 7/1997 van Phuoc
5,906,244 A * 5/1999 Thompson et al. ......... 173/93.5
6,167,606 B1 1/2001 Mueller et al.
6,181,103 B1 1/2001 Chen
6,186,247 B1 * 2/2001 Wang ........................ 173/93.5
6,796,386 B2 9/2004 Izumisawa et al.
6,880,645 B2 4/2005 Izumisawa
6,889,778 B2 5/2005 Colangelo, III et al.

(Continued)

FOREIGN PATENT DOCUMENTS

EP 0724935 8/1996
JP 2004322262 11/2004
WO WO 2006/044693 A 4/2006

*Primary Examiner*—Thanh K Truong
(74) *Attorney, Agent, or Firm*—RatnerPrestia

(57) ABSTRACT

An electric impact tool in which a rotating mass rotates in a forward direction to impact upon and transfer torque to an anvil, and rotates in a reverse direction opposite the forward direction in response to such impact. A direction sensor monitors the direction of rotation of the rotating mass, and a controller turns an electric motor on and off during respective forward and reverse rotation of the rotating mass. An energy storing mechanism may be used to absorb energy from reverse rotation of the rotating mass and release the absorbed energy to rotate the rotating mass in the forward direction. A controller may be used to store the angular position of the rotating mass upon each impact and turn off the motor prior to the following impact to avoid energizing the motor during stall.

7 Claims, 9 Drawing Sheets

U.S. PATENT DOCUMENTS

| | | | | |
|---|---|---|---|---|
| 6,968,908 | B2 * | 11/2005 | Tokunaga et al. | 173/181 |
| 7,395,871 | B2 * | 7/2008 | Carrier et al. | 173/1 |
| 2003/0082439 | A1 | 5/2003 | Sakakibara | |
| 2006/0185869 | A1 * | 8/2006 | Arimura | 173/176 |
| 2007/0000676 | A1 * | 1/2007 | Arimura | 173/179 |
| 2007/0152660 | A1 * | 7/2007 | Simm et al. | 324/207.25 |

* cited by examiner

ELECTRIC MOTOR IMPACT TOOL

This is a divisional patent application of U.S. patent application Ser. No. 11/588,179, filed Oct. 26, 2006.

BACKGROUND

The present invention relates to an impact tool employing an electric motor.

Impact tools driven by air motors are known in the art. An impact tool is one in which an output shaft (commonly referred to as an "anvil") is struck by a rotating mass (commonly referred to in the art as a "hammer"). The output shaft is coupled to the fastener to be tightened or loosened, and each strike of the hammer on the anvil applies torque to the fastener. Because of the nature of impact loading compared to constant loading, an impact tool can deliver higher torque to the fastener than a constant drive fastener driver.

One known mechanism within an impact tool is the Maurer mechanism, so-named because of the original inventor of the concept, which is described in U.S. Pat. No. 3,661,217. In a typical Maurer mechanism, the hammer surrounds the anvil. The hammer backs up or rebounds in response to striking the anvil, and then resumes forward rotation. The geometric shapes of the hammer and anvil cause the hammer to cam past the anvil when the hammer resumes forward rotation, and strike the anvil on the subsequent rotation. This enables the hammer to rotate more than 360° prior to each impact with the anvil and deliver the maximum impact load to the anvil with each strike.

SUMMARY

Traditionally, prior to the present invention, air motors have been used with Maurer mechanisms because air motors can be directly coupled to the hammer frame, can accelerate rapidly, and experience negligible wear when routinely accelerated from a stalled position. Prior to the present invention, the general thinking in the art has been that electric motors would not function well with a Maurer mechanism because of the large current draw that would arise within the motor during hammer rebound. Unlike air motors, electric motors fail or experience damaging heat under conditions in which rotation in the forward direction is suddenly stopped while the motor is energized, and especially under conditions in which the output shaft of the electric motor is rotated opposite the forward direction while the motor is energized. Thus, a straight substitution of an electric motor for an air motor in an impact tool has not been considered feasible. One aspect of the present invention is to overcome what was previously considered not feasible, and design an impact tool having a Maurer mechanism driven by an electric motor.

In one embodiment, the invention provides an electric impact tool comprising an anvil; a rotating mass; a direction sensor; an electric motor; and a controller. The rotating mass is adapted to rotate in a forward direction to impact upon and transfer torque to the anvil, and adapted to rotate in a reverse direction opposite the forward direction in response to such impact. The direction sensor monitors the direction of rotation of the rotating mass and generates a direction signal indicating one of forward and reverse rotation of the rotating mass. The electric motor is operable in a forward mode to rotate the rotating mass in the forward direction. The controller receives the direction signal and disables operation of the motor in the forward mode during reverse rotation of the rotating mass and enables operation of the motor in forward mode when the rotating mass is not rotating in the reverse direction.

In some embodiments, the tool may include an energy storing mechanism operably interconnected with the rotating mass to absorb energy from reverse rotation of the rotating mass and to release the absorbed energy to rotate the rotating mass in the forward direction. In other embodiments, the controller may be programmed to operate the motor in reverse to assist the reverse rotation of the rotating mass during rebound.

The invention also provides a method for operating an electric impact tool that includes an anvil, a rotating mass, and an electric motor. The method includes impacting the anvil with forward rotation of the rotating mass to rotate the anvil in a forward direction; permitting the rotating mass to rotate in a reverse direction opposite the forward direction in response to impacting with the anvil; monitoring the direction of rotation of the rotating mass; and operating the motor in a forward mode to drive forward rotation of the rotating mass when the rotating mass is not rotating in the reverse direction.

In some embodiments, the method may include storing in an energy storing mechanism energy from the angular momentum of the rotating mass rotating in the reverse direction; and releasing energy from the energy storing mechanism to rotate the rotating mass in the forward direction.

In some embodiments, the method may include monitoring the angular position of the rotating mass, turning the motor off prior to the each impact with the anvil, and not turning the electric motor on again until forward rotation of the rotating mass is resumed. In other embodiments, the method may include operating the motor in reverse during rebound to assist the rotating mass to achieve a desired rebound angle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings. Further, “connected” and “coupled” are not restricted to physical or mechanical connections or couplings.

In the illustrated embodiment, components are said to rotate in a “forward direction” or a “reverse direction.” As will be appreciated after reading the following specification, the forward direction for the illustrated tool corresponds to driving a fastener clockwise, and the reverse direction corresponds to rotation in the opposite direction. Thus, the illustrated tool is configured to tighten right hand threaded fasteners by rotating them clockwise. The choice of forward direction and reverse direction for the illustrated embodiment is arbitrary, and the invention is equally applicable to a tool having a forward direction of counterclockwise and reverse direction of clockwise (e.g., a tool configured to loosen right-hand threaded fasteners).

Figure 1:
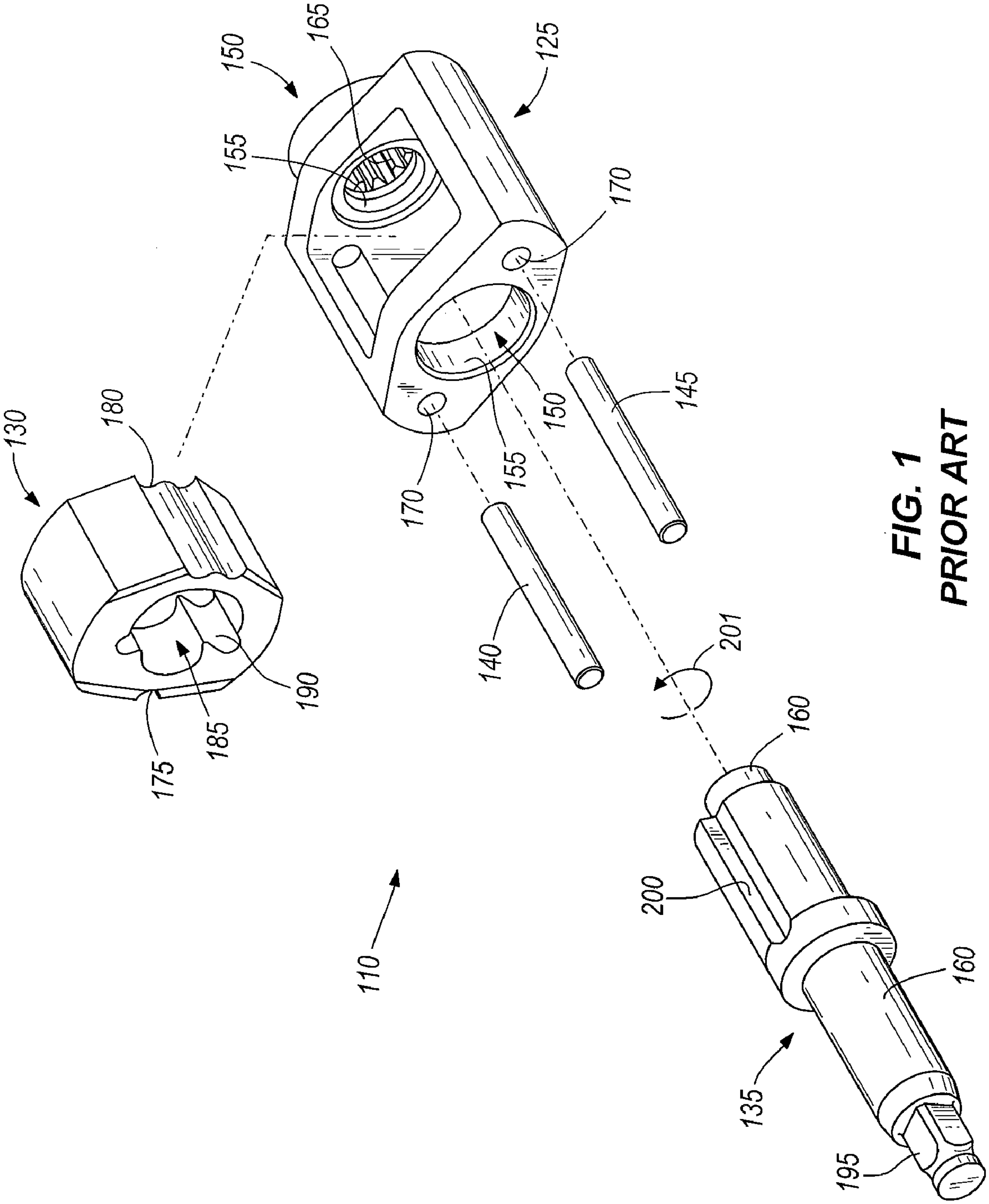
FIG. 1 PRIOR ART
FIG. 1 is an exploded view of a prior art Maurer mechanism.

FIG. 1 illustrates a prior art Maurer mechanism 110, the structure and operation of which are well known in the art for use with air motors. Variations of the prior art Maurer mechanism are described in U.S. Pat. Nos. 3,661,217; 3,552,499; 5,906,244; and 6,889,778. The entire disclosure of each of those patents is incorporated herein by reference. The Maurer mechanism 110 includes a hammer frame 125, a hammer 130, an anvil 135, a pivot pin 140, and a swing pin 145. The hammer frame 125 includes openings 150 at each end. Both openings 150 include smooth bearing surfaces 155 to support smooth portions 160 of the anvil 135 for free rotation of the anvil 135 and hammer frame 125 with respect to each other. One of the openings 150 also includes an extended splined portion 165 to facilitate coupling the hammer frame 125 to an output shaft of an air motor. The hammer frame 125 also includes holes 170 through which the pivot and swing pins 140, 145 extend.

The hammer 130 includes a narrow groove 175, a wide groove 180, and a central opening 185. A portion of the central opening 185 defines an impact surface 190. The pivot pin 140 is received in the narrow groove 175 to pivotally interconnect the hammer 130 to the hammer frame 125. The swing pin 145 moves within the wide groove 180 as the hammer 130 pivots on the pivot pin 140.

The anvil 135 includes an end portion 195 used as an output shaft of the tool in which the Maurer mechanism 110 is employed. The end portion 195 receives a socket or other means for transferring torque from the anvil 135 to the fastener to be rotated. The anvil 135 also includes an impact jaw 200 that is struck by the impact surface 190 of the hammer 130 to drive rotation of the anvil 135. Other known constructions of Maurer mechanisms include multiple hammers 130 that impact multiple impact jaws 200, and the present invention will function with substantially any configuration of the Maurer mechanism, and is not limited to the one illustrated.

Figures 2A, 2B, 2C, 2D, 2E, 2F:
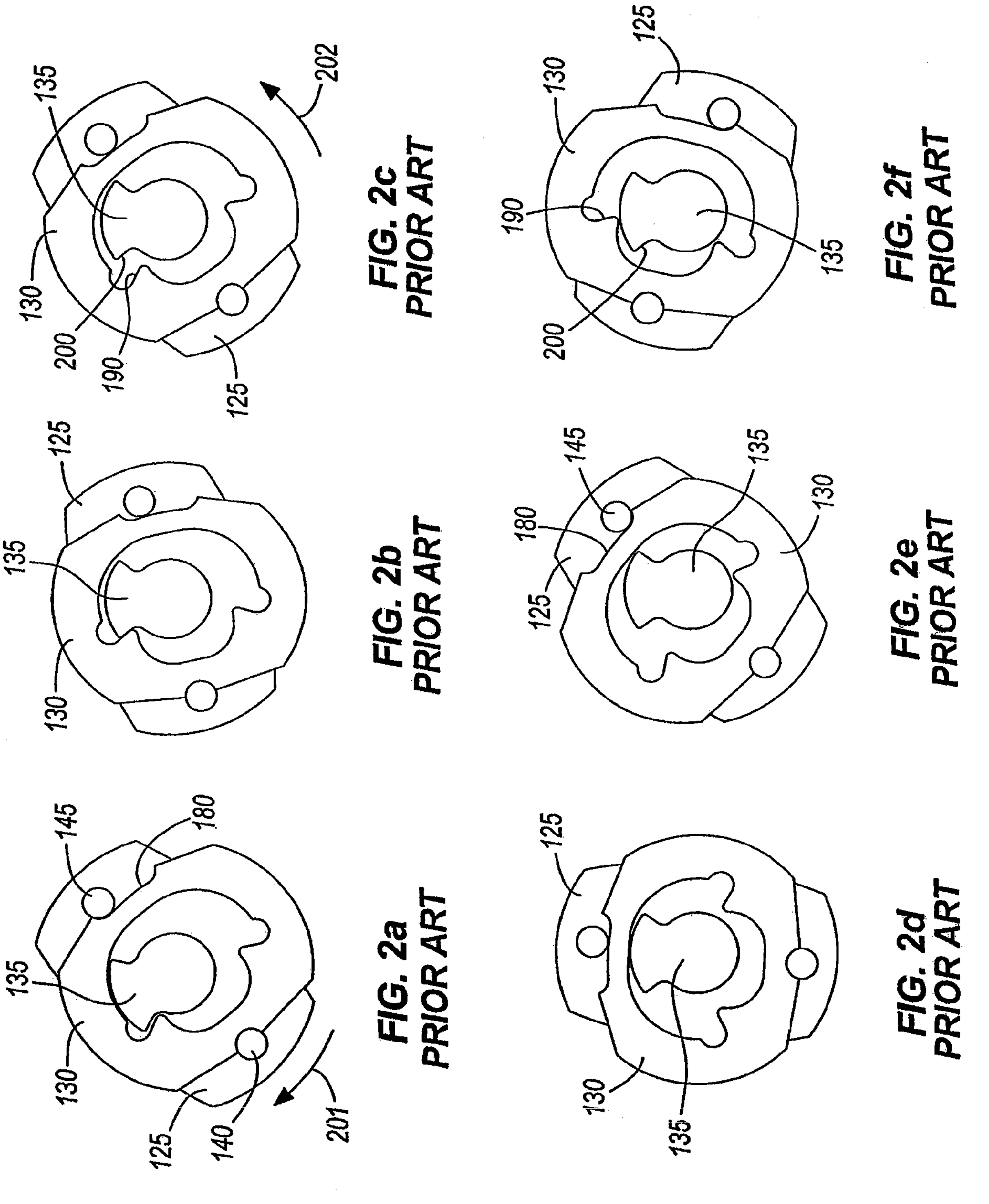
FIG. 2a PRIOR ART
FIG. 2b PRIOR ART
FIG. 2c PRIOR ART
FIG. 2d PRIOR ART
FIG. 2e PRIOR ART
FIG. 2f PRIOR ART
FIGS. 2*a*-2*l* are cross-sectional views illustrating the operation of the prior art Maurer mechanism.

With reference to FIGS. 2*a*-2*l*,the basic function of the Maurer mechanism 110 is as follows. The hammer frame 125 rotates in the forward direction 201 under the influence of an air motor. Upon impact (FIG. 2*a*) of the impact surface 190 on the impact jaw 200, the swing pin 145 is at a first end of the wide groove 180 in the hammer 130. Impact causes the anvil 135 to advance several degrees (FIG. 2*b*) in the forward direction 201 and causes the hammer 130 to pivot slightly on the pivot pin 140, which results in the swing pin 145 moving toward the center of the wide groove 180. In response to the impact, the hammer frame 125 and hammer 130 rotate in a reverse direction 202 (FIGS. 2*c* and 2*d*).

The rebound of the hammer 130 and hammer frame 125 operates against the motive force of the air motor, and in this regard, the air motor acts as a compressor during rebound. The compression of air in the air motor eventually overcomes the rebound momentum and begins rotating the hammer frame 125 in the forward direction 201 again. The hammer 130 continues its rebound after the hammer frame 125 begins rotating in the forward direction 201, until the swing pin 145 abuts the second end of the wide groove 180 (FIG. 2*e*). At that time, torque from the air motor is transferred to the hammer 130 through the hammer frame 125 and pins 140, 145, and both the hammer frame 125 and hammer 130 rotate in the forward direction 201.

Figure 2I:
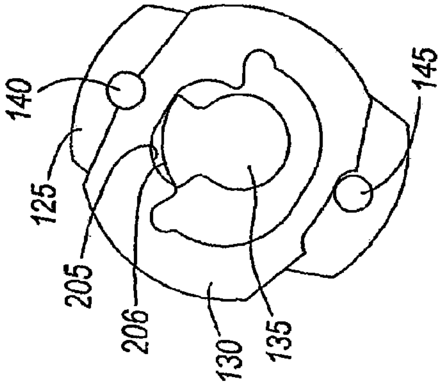
FIG. 2i PRIOR ART
Figure 2H:
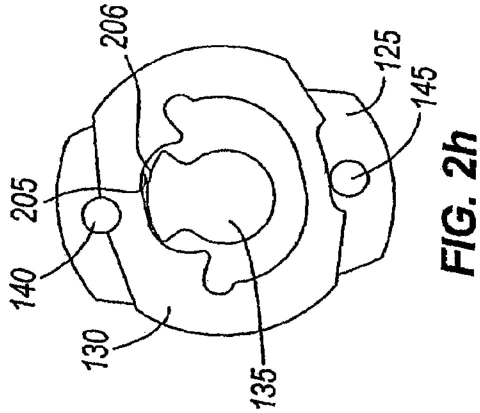
FIG. 2h PRIOR ART
Figure 2G:
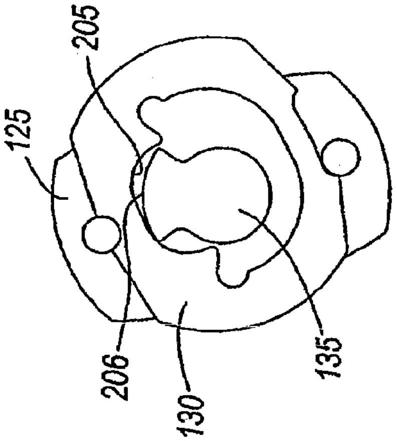
FIG. 2g PRIOR ART
Figure 2L:
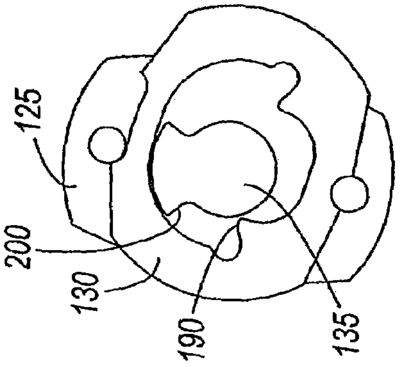
FIG. 2l PRIOR ART
Figure 2K:
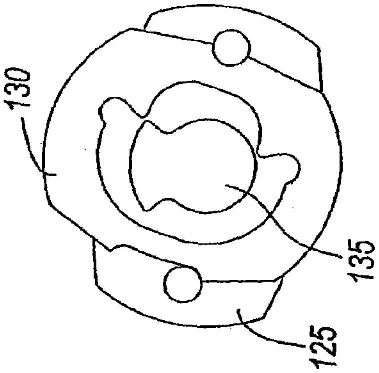
FIG. 2k PRIOR ART
Figure 2J:
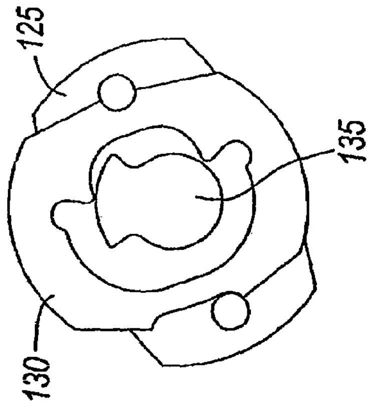
FIG. 2j PRIOR ART

With the swing pin 145 at the second end of the wide groove 180, the impact surface 190 of the hammer 130 rotates past the impact jaw 200 of the anvil 135 (FIG. 2*f*). A smooth curved surface 205 of the central opening 185 of the hammer 130 slides against a smooth curved surface 206 of the anvil 135 as the hammer 130 rotates (FIGS. 2*g*-2*i*). Friction arising from the engagement of the smooth curved surfaces 205, 206 causes rotation of the hammer 130 to slow down with respect to the rotation of the hammer frame 125, which results in the hammer 130 pivoting on the pivot pin 140 to move the swing pin 145 back to the first end of the wide groove 180 (FIG. 2*j*). In this condition, the hammer frame 125 and hammer 130 continue to rotate in the forward direction 201 (FIGS. 2*k* and 2*l*) until the impact surface 190 again strikes the impact jaw 200, and the cycle begins again.

The term “stall” is used in the art to describe the state of any portion of the rotating mass when its rotation in either the forward or reverse direction is stopped. The angular position of the impact surface 190 at forward stall (i.e., when it strikes the impact jaw 200 and begins to rebound) is referred to herein as the “zero position.” The zero position is changed with each impact cycle because the anvil 135 is rotated in the forward direction 201 a few degrees at impact. The angular displacement between the zero position and the position of the impact surface 190 at reverse stall (i.e., when it stops rebounding and begins rotating again in the forward direction) is referred to herein as the “rebound angle.” the rebound angle may be about 120°, but will depend on the force of the air motor and the joint condition (rebounding farther when the joint is hard and less when the joint is soft). The Maurer mechanism permits the hammer 130 to rotate through the rebound angle plus 360° (a total of about 480° if the rebound angle is 120°) in the forward direction 201 prior to each impact, which permits the hammer 130 to achieve greater angular velocity and momentum, and to deliver greater energy to the anvil 135 at impact than if the hammer 130 was only permitted to rotate through the rebound angle (e.g., only about 120° in the example above) between each impact.

Figure 3:
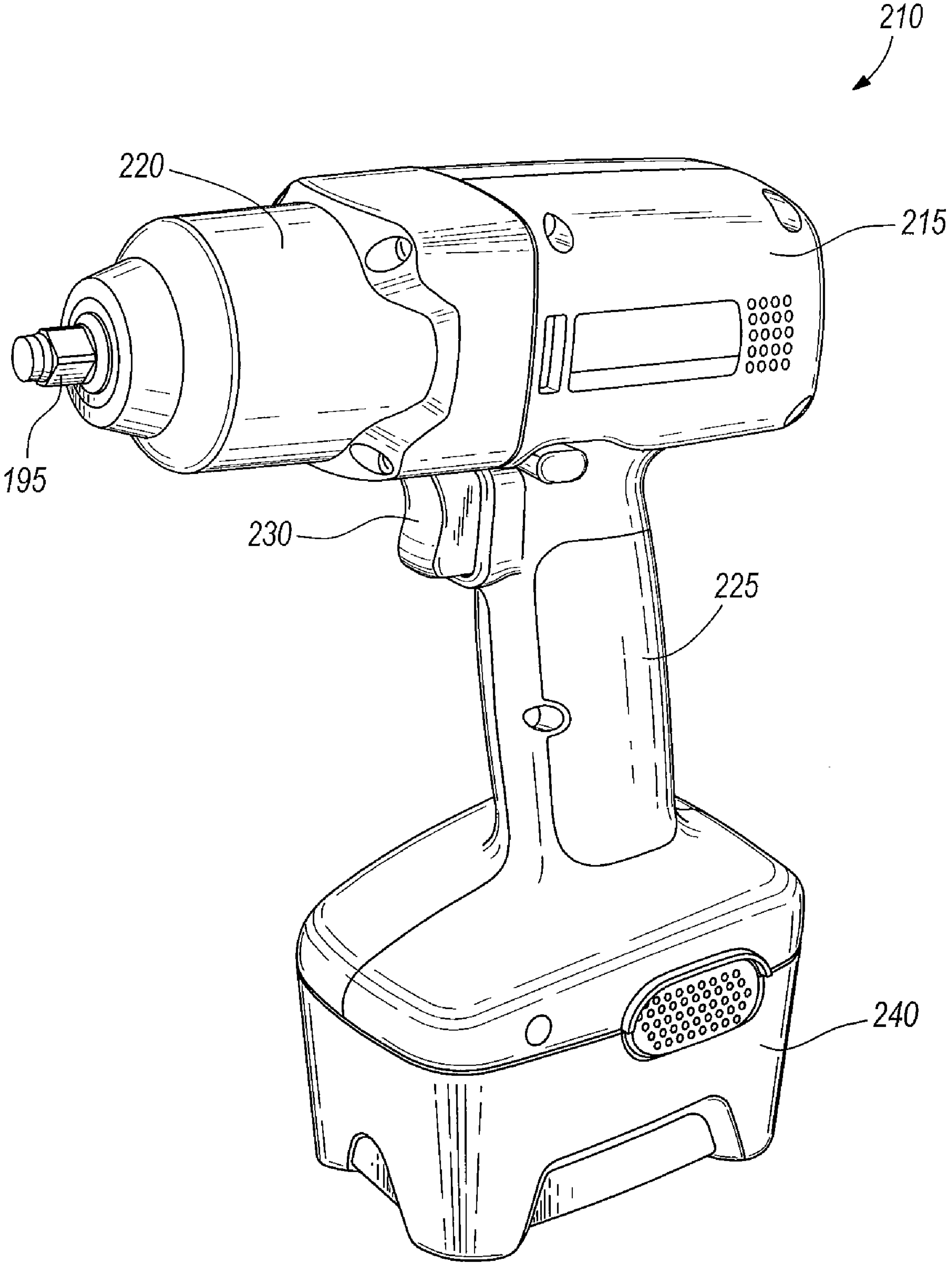
FIG. 3 is a perspective view of an impact tool using an electric motor according to the present invention.

FIG. 3 illustrates an electric impact tool 210 including a housing that includes a motor guard 215 and a hammer guard 220, a handle 225, a trigger 230 movable with respect to the handle 225, and the output end 195 of the anvil of a Maurer mechanism similar to that described above. The illustrated tool 210 is for use with a direct current power supply, such as the illustrated battery 240, but may in other embodiments be connected through a cord to a supply of alternating current, in which case the current may be converted to direct current or remain as alternating current depending on the electronics used within the tool 210.

Figure 4:
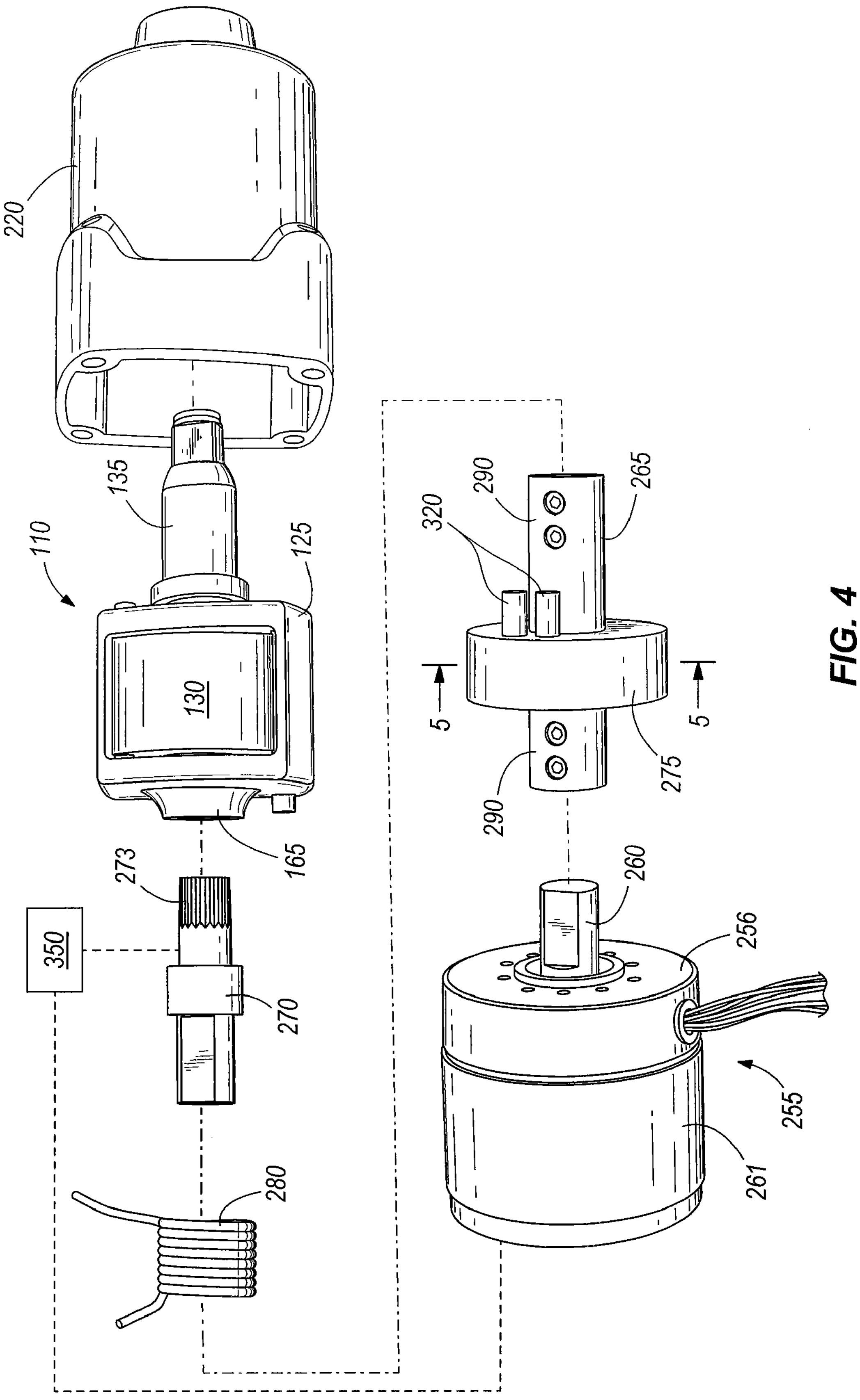
FIG. 4 is an exploded view of the impact tool.

FIG. 4 illustrates the components within the housing, including an electric motor 255 having a stator 256 and a rotor that includes an output shaft 260 and a rear portion 261 fixed for rotation with the output shaft 260. Other internal components include a shaft coupling 265, a step shaft 270 having a splined end 273, a sprag clutch 275, a torsion spring 280, and a Maurer mechanism 110 as described above. The electric motor 255 is preferably a DC brushless motor, but may be any electric motor that meets the functional requirements described herein. One commercially-available and suitable motor is model number TG2330 from ThinGap Corporation of Ventura, Calif., which is a 1.1 horsepower brushless DC motor. The motor 255 is mounted with the stator 256 fixed with respect to the tool 210 housing. Of course, the motor for a particular application must be selected to meet the power output requirements for that application. The motor 255 operates in a forward mode to drive forward rotation of the output shaft 260 and in a reverse mode to drive reverse rotation of the output shaft 260.

The shaft coupling 265 includes two female ends 290, one of which receives the output shaft 260 of the electric motor 255 and the other of which receives the step shaft 270. The output shaft 260 and step shaft 270 are coupled to the shaft coupling 265 with set screws or other suitable fasteners, or through keys, splines, or other known means for coupling shafts for rotation together. The splined end 273 of the step shaft 270 is received within the extended splined portion 165 of the hammer frame 125 of the Maurer mechanism 110.

Figure 5:
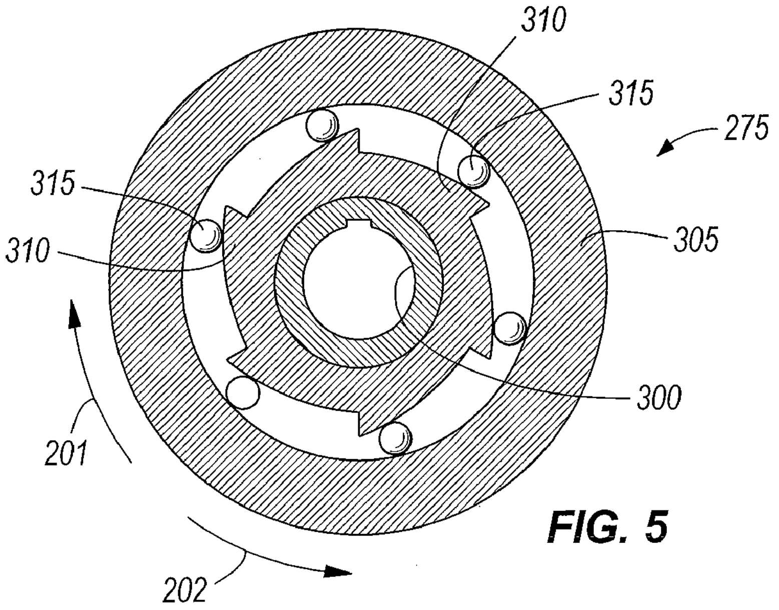
FIG. 5 is a cross-sectional view, taken along line 5-5 in FIG. 4, of the sprag clutch on the main shaft.

The sprag clutch 275 is also referred to in the art as an overrunning clutch. One commercially-available and suitable sprag clutch is model number RC-121610-FS from The Timken Company and sold under the Torrington brand name. With reference to FIG. 5, the sprag clutch 275 includes inner and outer rings or races 300, 305. Between the rings 300, 305 is a one-way coupling mechanism for permitting the inner ring 300 to rotate in the forward direction 201 with respect to the outer ring 305, but coupling the inner ring 300 to the outer ring 305 when the inner ring 300 is rotated in the reverse direction 202. The mechanism in the illustrated clutch 275 includes ramps 310 fixed for rotation in both directions with the inner ring 300 and balls or roller bearings 315 that jam between the ramps 310 and outer ring 305 (as illustrated) when the ramps 310 and inner ring 300 rotate in the reverse direction 202, but that roll down the ramps 310 when the inner ring 300 and ramps 310 rotate in the forward direction 201 faster than the outer ring 305. The illustrated clutch 275 is but one form of sprag or overrunning clutch available. Other types of clutches, including those using rockers and cam mechanisms for coupling the rings 300, 305 for rotation together in one direction but not the other direction, may also be used in the present invention.

With respect to the illustrated embodiment, the term "rotating mass" includes the motor rotor, shaft coupling 265, step shaft 270, Maurer mechanism 110, and portions of the clutch 275 (depending the direction of rotation and whether or not the inner and outer rings 300, 305 are coupled for rotation together). In other embodiments, what is included in the rotating mass will depend on what components rotate in the forward and reverse directions.

With reference again to FIG. 4, a pair of roll pins 320 extend from a side of the outer ring 305 of the sprag clutch 275. The torsion spring 280 surrounds the shaft coupling 265, with one end of the spring 280 extending between the roll pins 320. The other end of the torsion spring 280 is fixed with respect to the housing of the tool 210 by, for example, abutting against an inner surface of the housing. Any other suitable means for interconnecting the ends of the spring 280 with the outer ring 305 of the sprag clutch 275 and the tool housing can be used, and the illustrated and described means should not be regarded as limiting. When the shaft coupling 265 rotates in the forward direction 201, the inner ring 300 freely rotates with respect to the outer ring 305. When the shaft coupling 265 rotates in the reverse direction 202, however, the rings 300, 305 are coupled for rotation together and load the spring 280. As the spring 280 absorbs energy from the rotating mass, it slows it down and eventually stops the rotating mass. Then the spring 280 unloads and causes forward rotation of the rotating mass. The clutch 275 drives forward rotation of the rotating mass until the inner ring 300 is rotating faster than (i.e., overruns) the outer ring 305 (with the assistance of the motor 255, as will be described further below), at which time the inner ring 300 is uncoupled from the outer ring 305 and spring 280. Although the illustrated embodiment includes a torsion spring 280, other types of springs or energy storing and releasing devices can be used in the present invention.

Figure 6:
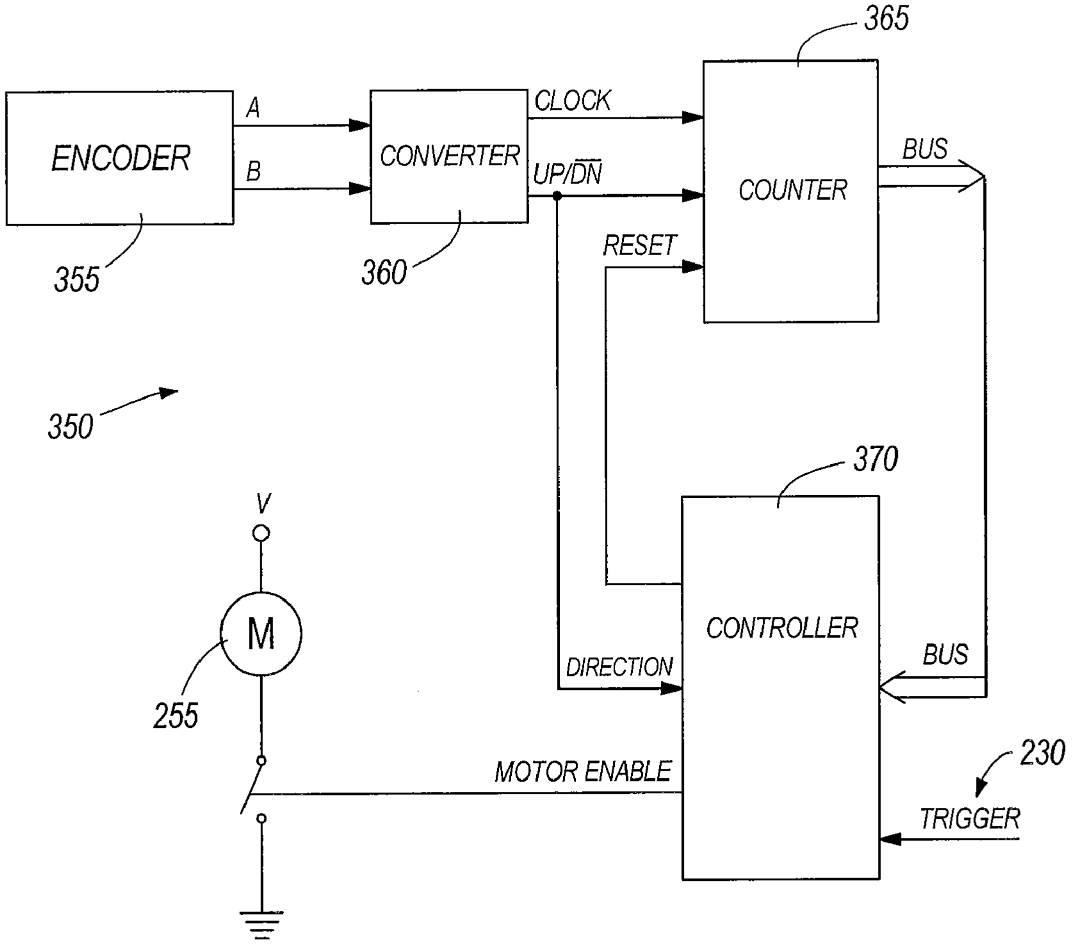
FIG. 6 is a schematic diagram of the control circuitry for the impact tool.

FIG. 6 schematically illustrates a control system 350 that monitors and controls operation of the tool 210. The control system 350 includes an encoder 355, a converter 360, a counter 365, and a controller 370. Controller 370 can be implemented, for example, using one or more discrete circuit components, programmable logic devices (PLDs), microcontrollers, and/or microprocessors.

The encoder 355 generates pulses in response to rotation of the rotating mass in the tool 210. One type of encoder 355 that maybe used in the control system 350 is an optical encoder. An optical encoder includes one or more optical sensors in combination with an encoder wheel having a plurality of windows. The resolution of the encoder can be increased by increasing the number of windows in the wheel. One example of a suitable optical encoder is the HEDS-9100 with an encoder wheel from Agilent Technologies. The optical sensors are out of phase with respect to each other. As the wheel rotates with a portion of the rotating mass, each optical sensor generates a pulse each time a window passes in front of it. These pulses are schematically illustrated in FIG. 6 as the A and B outputs of the encoder. The encoder 355 may monitor rotation of substantially any portion of the rotating mass (e.g., the step shaft 270). Some motors are equipped with built-in encoders or resolvers, in which case, the control system 350 can tap into the pulses generated by those components.

The converter 360 receives the A and B pulses created by the encoder 355 and generates an up or down signal, indicative of respective forward 201 and reverse 202 rotation of the rotating mass, depending on the order in which it receives the A and B signals. The up/down signal may be, for example, an on or off voltage (e.g., a 5V signal for "UP" and a 0V signal for "DOWN"). The converter 360 also generates a clock pulse, which corresponds to movement of the windows of the encoder wheel past the optical sensors. The up/down signal is delivered to the counter 365 and the controller 370, and the clock pulses are delivered to the counter 365.

The counter 365 counts the number of clock pulses it receives from the converter 360 and stores the running total or count of pulses, which corresponds to the angular position of the encoder wheel and thus the angular position of the rotating mass. When the up/down signal is "UP," the counter 365 adds the clock pulses to the count, and when the up/down signal is "DOWN," the counter 365 subtracts the clock pulses from the count. Some devices include the functionality of the converter 360 and counter 365. For example, one suitable converter 360 and counter 365 is the LS7166 manufactured by LSI Computer Systems, Inc. of Melville, N.Y.

The count from the counter 365 is reported to the controller 370. Based on the up/down signal from the converter 360, and the count from the counter 365, the controller 370 at all times knows the direction of rotation of the rotating mass (based on up/down signal), and the angular position of the rotating mass (based on the count). The controller 370 may send a reset signal to the counter 365 to reset the count to zero. The controller 370 also receives a signal corresponding to whether the trigger 230 is engaged or disengaged. The controller 370 is also operably connected to the motor 255 to enable and disable its operation.

The encoder 355, converter 360, and counter 365 together perform the function of a direction and position sensor. There are other components that could be used within the invention to perform the direction and position sensor function, and the illustrated encoder 355, converter 360, and counter 365 should not be regarded as limiting. For example, a magnetic pickup device or a resolver may be used as part of the direction and position sensor.

Figure 7:
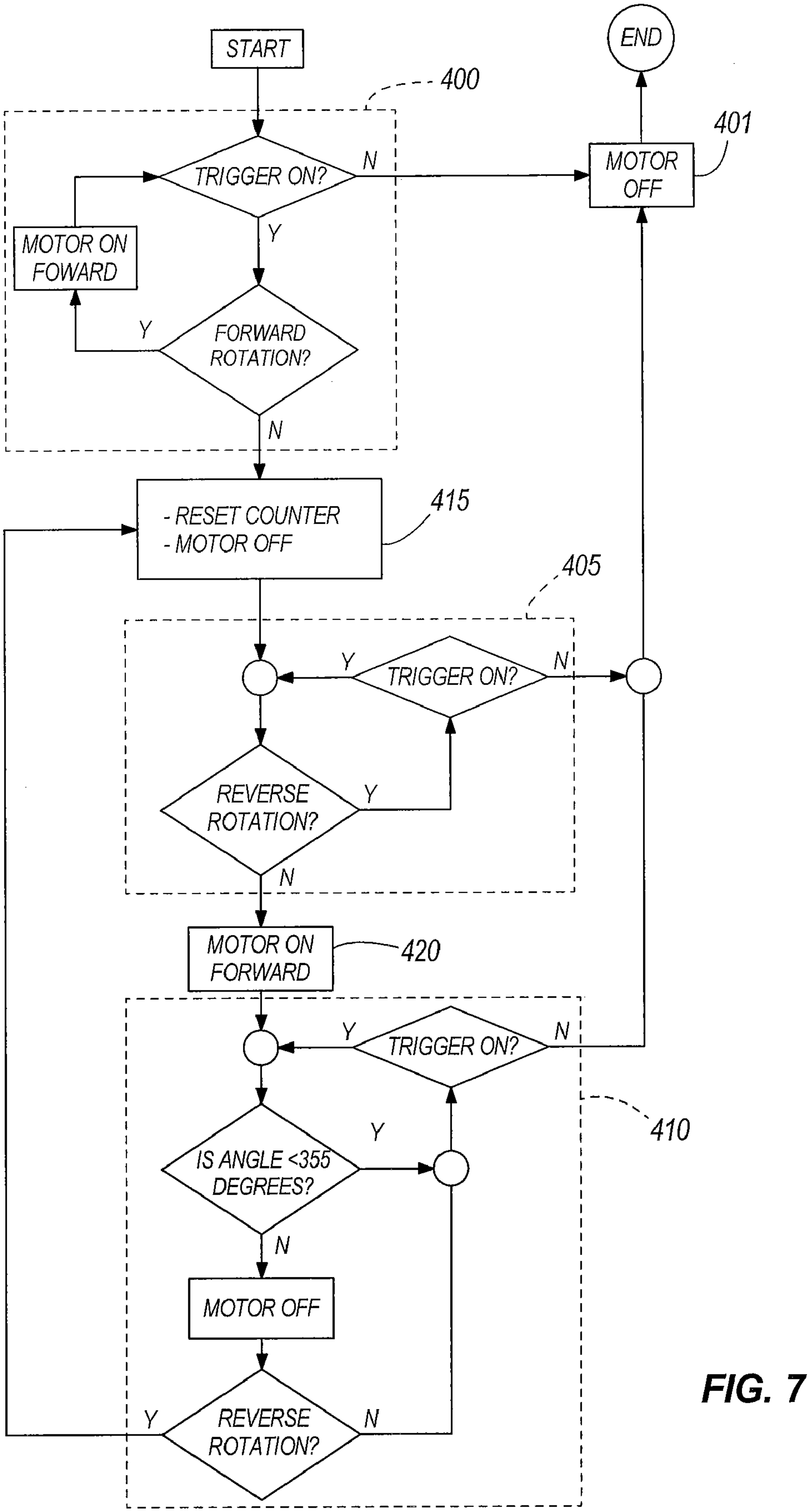
FIG. 7 is a flow diagram of the control logic for the impact tool.

Operation of the tool 210 will now be described with reference to the logic executed by the controller 370, which is illustrated in the flow diagram of FIG. 7. The control logic includes three basic loops: the start-up loop 400, the reverse loop 405, and the forward loop 410. In the start-up loop 400, the controller 370 turns on the motor 255 and operates it in forward mode as long as the trigger 230 is engaged and the rotating mass is either not rotating (i.e., when tool is at rest and trigger is initially engaged, or when the rotating mass experiences its first forward stall) or rotating forward. If the trigger 230 is disengaged, the controller 370 exits the start-up loop 400, turns off the motor 255 at step 401, and ends the program.

As long as the trigger 230 is engaged, however, the controller 370 will operate the motor 255 in forward mode and drive forward rotation of the rotating mass. The first impact of the hammer 130 on the anvil 135 that results in a rebound is typically a relatively "soft" impact, which means that the fastener is still able to be rotated relatively easily. The Maurer mechanism will rebound as a result of such soft impact, however, which will increase current draw in the motor 255. The current draw in the motor 255 resulting from such first soft impact is not typically significant and will not typically rise to a level that will damage the motor 255. Still, the electric motor 255 should be provided with a motor drive current limit to ensure that current draw during the initial rebound does not exceed what is tolerable by the motor 255. This first impact establishes the first zero position for the controller 370, and from this point forward in the operation of the tool 210, the controller 370 has continuous knowledge of the angular position and direction of rotation of the rotating mass.

When the rotating mass begins rebounding (i.e., "ZERO OR FORWARD ROTATION?" equals "NO"), the controller 370 exits the start-up loop 400 and goes to step 415 prior to starting the reverse loop 405. At 415, the controller 370 resets the counter 365 and turns off the motor 255. Resetting the counter 365 establishes the zero position.

The controller 370 stays in the reverse loop 405 while the trigger 230 is engaged and the rotating mass is rotating in the reverse direction 202. If the trigger 230 is released, the controller 370 ensures that the motor 255 is shut down at step 401, and ends the program. As the rotating mass rotates in the reverse direction 202 during rebound, the counter 265 keeps track of the rebound angle. During rebound, the angular momentum of the rotating mass is stored in the torsion spring 280. The rebound angle will depend on the stiffness of the spring 280. Eventually, the torsion spring 280 absorbs all energy from, and stops the reverse rotation of, the rotating mass (i.e., the rotating mass stalls). Then the torsion spring 280 releases the stored energy back into the rotating mass by rotating the rotating mass in the forward direction 201. Upon reverse stall (i.e., "REVERSE ROTATION?" equals "NO"), the controller 370 exits the reverse loop 405, turns the motor 255 on at step 420, and enters the forward loop 410.

In the forward loop 410, the controller 370 monitors whether the trigger 230 is engaged and also monitors direction of rotation and angular position of the rotating mass (based on information received from the converter 360 and counter 365). If the trigger 230 is released, the controller turns the motor off at 401, and ends the program. As the angular position of the rotating mass approaches 360°, it is approaching the zero position and the next impact. To avoid large current draws on the motor 255, the controller 370 is programmed with a cutoff angle. The cutoff angle is the angular position of the rotating mass at which the controller 370 turns off the motor 255 so that the rotating mass is free-spinning upon impact.

There is typically some de-energizing of the motor 255 prior to it completely ceasing to drive the output shaft 260, and the illustrated tool 210 is programmed with a cutoff angle that permits the motor to completely de-energize prior to impact. As mentioned above, electric motors can typically handle a certain amount of current draw during stall, so it is possible that the cutoff angle may be set to result in less than complete de-energizing of the motor prior to impact, so long as any current draw that may result from incomplete de-energizing does not rise over what would lower the useful life of the motor. Experiments determined that a cutoff angle of about 355° was usually sufficient. Recognizing that when the rotating mass reaches an angular position of 360°, it is again at the zero position, this would give the motor about 5° to fully de-energize prior to impact. The motor 255 may be turned off sooner, but there will eventually come a point where statistically significant losses in output torque of the tool 210 begin to occur. Experiments with different cutoff angles found no significant loss of output torque for a range of shut-down angles between 345° and 355° (i.e., turning off the motor 15° to 5° prior to the zero position). Turning the motor 255 off more than about 15° prior to reaching the zero position may result in loss of output torque for the tool 210.

In the forward loop 410, the controller 370 turns off the motor 255 when the cutoff angle is achieved. The controller 370 now monitors whether the trigger 230 is still engaged and whether the rotating mass is rotating in the reverse direction 202, indicative of rebound. Once the rotating mass rebounds and starts rotating in the reverse direction 202, the controller 370 exits the forward loop 410, resets the counter 365 at step 415, and returns to the reverse loop 405. While the trigger 230 is engaged, the controller 370 moves between the forward and reverse loops 405, 410 to permit the cycles of storing and recycling rebound momentum of the rotating mass in the spring 280, driving forward rotation of the rotating mass with the spring 280 and motor 255, and turning off the motor 255 just prior to impact and during rebound.

Figure 8:
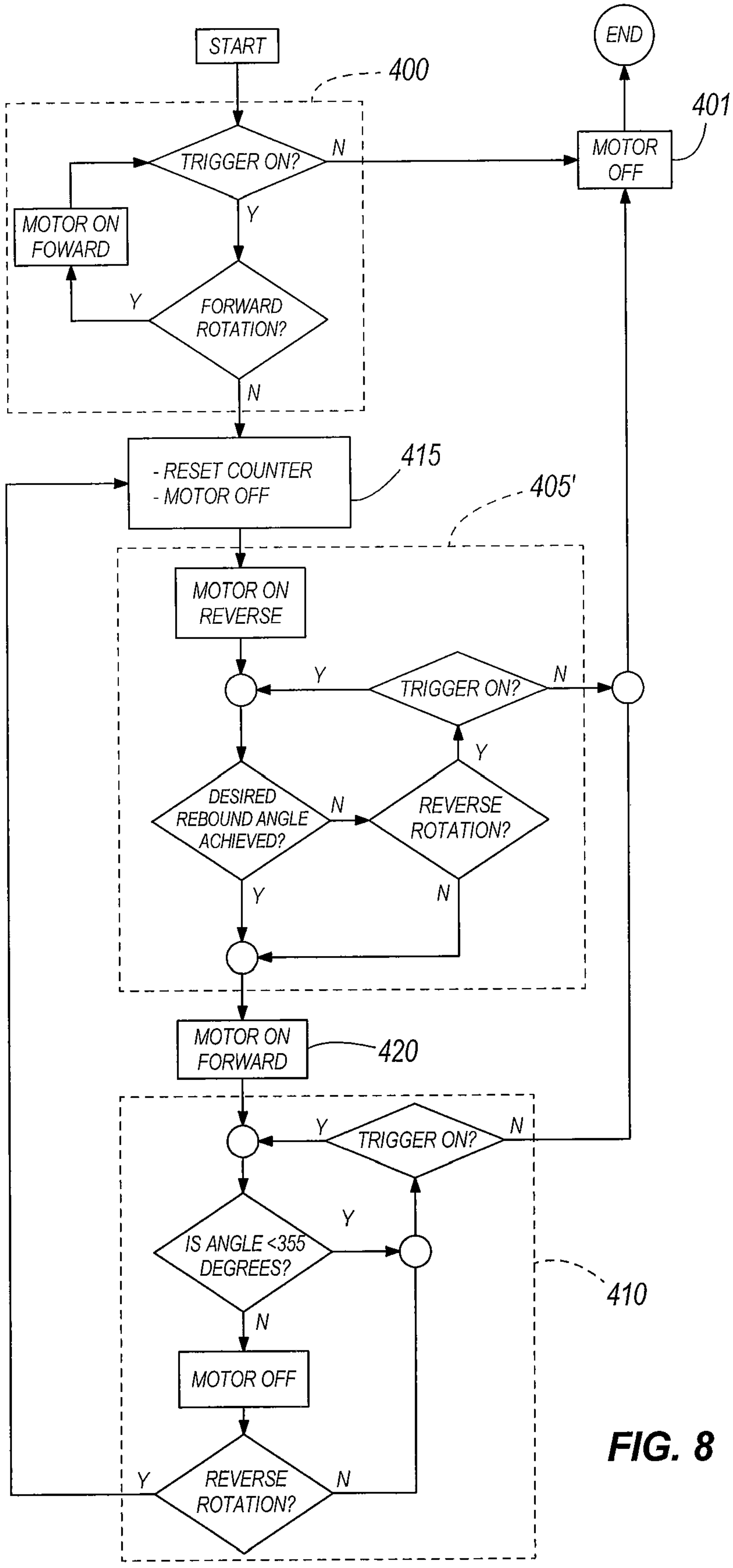
FIG. 8 is a flow diagram of alternative control logic for the impact tool.

FIG. 8 illustrates an alternative flow diagram of the logic that may be executed by the controller 370. This flow diagram is identical to the flow diagram in FIG. 7, except that the reverse loop 405 of FIG. 7 has been replaced with the reverse loop 405' of FIG. 8. In the reverse loop 405', the controller 370 turns the motor 255 on in reverse to assist rebound of the rotating mass. The controller 370 compares the angular position of the rotating mass with a desired rebound angle (e.g., 120°). The controller 370 also monitors the direction of rotation of the rotating mass. While the trigger 230 is actuated (i.e., "TRIGGER ON?" equals "YES"), the desired rebound angle has not been achieved (i.e., "DESIRED REBOUND ANGLE ACHIEVED?" equals "NO"), and the rotating mass is rotating in reverse (i.e., "REVERSE ROTATION" equals "YES"), the motor 255 will continue to rotate the rotating mass in reverse. If the trigger is released (i.e., "TRIGGER ON?" equals "NO"), the controller 370 will exit the reverse loop 405', turn off the motor 255 at 401, and end the program. When the desired rebound angle is achieved (i.e., "DESIRED REBOUND ANGLE ACHIEVED?" equals "YES") or the rotating mass ceases rotating in reverse (i.e., "REVERSE ROTATION" equals "NO") for any reason, the controller 370 will exit the reverse loop 405', turn the motor 255 on in the forward direction at 420, and enter the forward loop 410.

Figure 9:
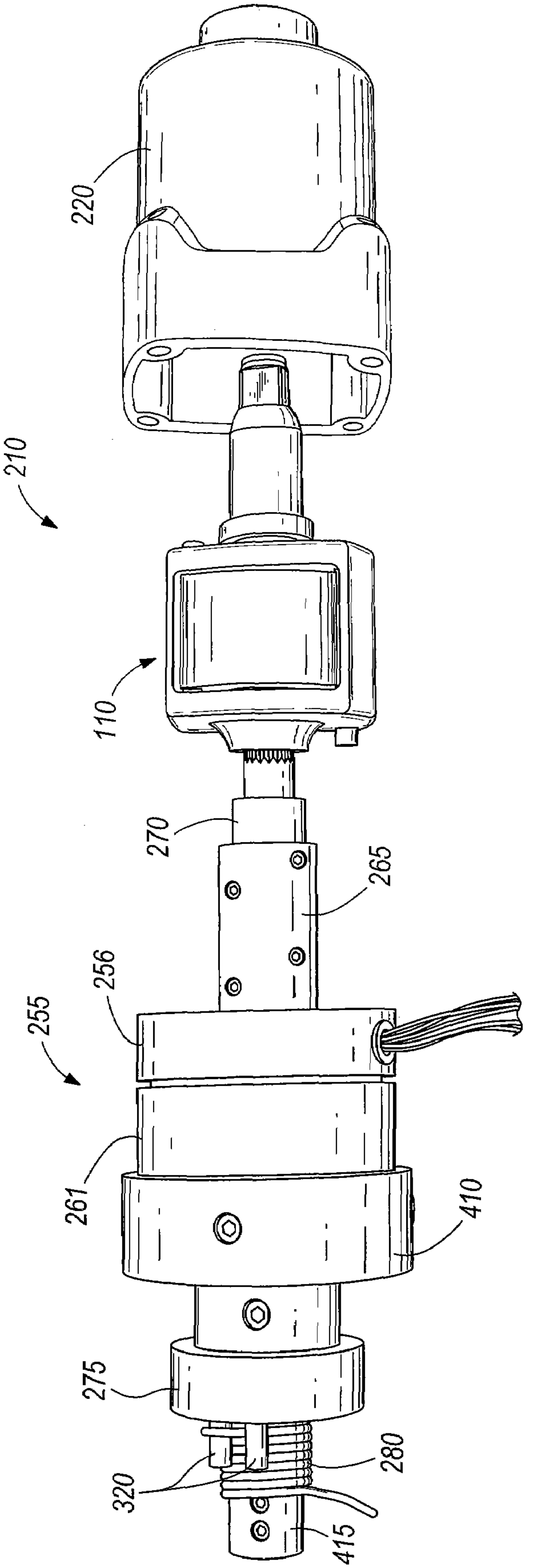
FIG. 9 is an exploded view of an alternative construction of the tool.

FIG. 9 illustrates an alternative construction of the tool 210, in which the clutch 275 and spring 280 are mounted to the rear portion 261 of the rotor. More specifically, a cup 410 is affixed to the rear portion 261 of the rotor, and is fixed for rotation with a rearwardly-extending shaft 415 on which the clutch 275 and spring 280 are mounted. The added mass of the cup 410 creates more angular momentum of the rotating mass, which may be beneficial in some applications. Also, positioning some of the rotating mass rearwardly of the motor 255 may help balance the tool 210, depending on the shape and relative position of the handle 225. This embodiment may operate with the control logic of either of FIGS. 7 and 8.

The present invention also contemplates operation without the use of the energy storing mechanism. The control logic of FIGS. 7 and 8 applies equally to embodiments that use energy storing mechanism and those that do not. The controller 370 may turn on the motor 255 in the forward direction 201 in response to the rotating mass coasting to a halt or bumping against the back side of the anvil 135 during rebound, or the controller 370 may turn on the motor 255 in reverse during rebound to achieve a desired rebound angle. In alternative embodiments, the controller 370 may turn on the motor 255 in reverse only when the natural rebound of the rotating mass does not achieve the desired rebound angle prior to stall.

Thus, the invention provides, among other things, an electric motor driven rotary impact tool that turns off the electric motor just prior to impact, and that keeps the motor turned off or operates the electric motor in reverse during rebound. In some embodiments, the invention may employ an energy storing mechanism to store the energy of the rotating mass during rebound and assist the electric motor in driving the rotating mass in the forward direction. In such embodiments, the present invention recycles some of the angular momentum of the rotating mass from reverse rotation for use in driving forward rotation of the rotating mass.

What is claimed is:

1. A method for operating an electric impact tool that includes an anvil, a rotating mass, and an electric motor, the method comprising:

(a) impacting the anvil with forward rotation of the rotating mass to rotate the anvil in a forward direction;

(b) permitting the rotating mass to rotate in a reverse direction opposite the forward direction in response to impacting with the anvil;

(c) monitoring the direction of rotation of the rotating mass; and (d) disabling operation of the motor in a forward mode when the rotating mass is rotating in the reverse direction.

2. The method of claim 1, wherein step (d) includes monitoring the angular position of the rotating mass, disabling the motor from operating in the forward mode prior to the each impact with the anvil, and preventing the motor from operating in the forward mode again until reverse rotation of the rotating mass ceases.

3. The method of claim 2, further comprising selecting a rebound angle equal to a desired angular position from which the rotating mass begins forward rotation; and wherein step (b) includes operating the motor in a reverse mode to drive rotation of the rotating mass in the reverse direction until the rotating mass reaches the rebound angle.

4. The method of claim 1, wherein step (d) includes turning the motor off at an angular position that permits substantially complete de-energizing of the motor prior to impact.

5. The method of claim 1, wherein step (d) includes turning the motor off about 5°-15° prior the rotating mass impacting the anvil.

6. The method of claim 1, further comprising the step of storing in an energy storing mechanism energy from the angular momentum of the rotating mass rotating in the reverse direction; and releasing energy from the energy storing mechanism to rotate the rotating mass in the forward direction.

7. The method of claim 6, further comprising coupling the energy storing mechanism with the rotating mass during reverse rotation of the rotating mass and while the rotating mass is rotating under the influence of the energy storing mechanism, and uncoupling the energy storing mechanism from the rotating mass when the rotating mass is rotating in the forward direction without the influence of the energy storing mechanism.

* * * * *